United States Patent
Munemura et al.

(10) Patent No.: US 9,027,993 B2
(45) Date of Patent: May 12, 2015

(54) VEHICLE SEAT

(71) Applicant: NHK Spring Co., Ltd., Yokohama (JP)

(72) Inventors: Nozomu Munemura, Yokohama (JP); Hironobu Nakane, Yokohama (JP); Ryo Nagahara, Yokohama (JP); Tadanori Hisamoto, Yokohama (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 86 days.

(21) Appl. No.: 13/864,144

(22) Filed: Apr. 16, 2013

(65) Prior Publication Data

US 2013/0278030 A1    Oct. 24, 2013

(30) Foreign Application Priority Data

Apr. 18, 2012 (JP) ................................ 2012-094982

(51) Int. Cl.
| B60N 2/42 | (2006.01) |
| B60N 2/427 | (2006.01) |
| B60N 2/30 | (2006.01) |
| B60N 2/16 | (2006.01) |

(52) U.S. Cl.
CPC .......... *B60N 2/42754* (2013.01); *B60N 2/3065* (2013.01); *B60N 2/1615* (2013.01)

(58) Field of Classification Search
CPC .......................... B60N 2/3065; B60N 2/42754
USPC ................... 297/344.15, 340, 216.1; 248/421
See application file for complete search history.

(56) References Cited

U.S. PATENT DOCUMENTS

| 6,502,799 B2 * | 1/2003 | Lepaule ..................... 248/423 X |
| 7,413,252 B2 * | 8/2008 | Kim et al. ................. 297/344.15 |
| 7,717,509 B2 * | 5/2010 | Kojima ................ 297/344.15 X |
| 8,616,645 B2 * | 12/2013 | Ito ............................ 297/344.15 |

FOREIGN PATENT DOCUMENTS

JP        2010-0184582        8/2010

* cited by examiner

*Primary Examiner* — Anthony D Barfield
(74) *Attorney, Agent, or Firm* — Knobbe Martens Olson & Bear LLP (57) ABSTRACT

A vehicle seat comprises: a vehicle body side member; a seat cushion having left and right side frames; left and right front links provided respectively between front end sides of the left and right side frames and the vehicle body side member, the left and right front links configure a portion of a lifter mechanism that moves the seat cushion, and one end side of the respective left and right front links is coupled to the vehicle body side member so as to be rotatable about an axis along the seat left-right direction; and a coupling member coupling together front end sides of the left and right side frames along the seat left-right direction, that is rotatable with respect to the left and right side frames about an axis along the seat left-right direction, and that is joined to other end side of the respective left and right front links.

5 Claims, 5 Drawing Sheets

VEHICLE SEAT

CROSS-REFERENCE TO RELATED APPLICATION

This application claims priority under 35 USC 119 from Japanese Patent Application No. 2012-94982 filed on Apr. 18, 2012, the disclosure of which is incorporated by reference herein.

BACKGROUND OF THE INVENTION

1. Technical Field

The present invention relates to a vehicle seat, and in particular relates to a vehicle seat equipped with a lifter mechanism.

2. Related Art

A vehicle seat disclosed in Japanese Patent Application Laid-Open (JP-A) No. 2010-184582 includes an upper frame of a seat cushion that has left and right side members and first, second and third connection rods that connect the left and right side members in the seat left-right direction. A left and right first link (front link) and a left and right second link (rear link) are provided between the upper frame and left and right guide rails (lower frame).

One end portion of the first link is rotatably connected to a front end portion of an upper rail installed at the guide rail and the other end portion of the first link is rotatably connected to the second connection rod. One end portion of the second link is rotatably connected to a rear end portion of the upper rail, and the other end portion of the second link is rotatably connected to a third connection rod. As a result, a four-jointed link mechanism is configured from the upper frame, the first and second links, and the upper rail, such that the upper frame is connected to the left and right upper rails so as to be capable of moving up and down.

SUMMARY

In a vehicle seat as described above, excessive load from an occupant attempting to move under inertia due to impact during a vehicle collision is input through for example a seatbelt. Since such excessive load is input to the above first and second links (a link section), there is accordingly a demand to secure rigidity and strength in the link section.

However, there are also demands to reduce the weight of vehicle seats from the perspective of enhancing vehicle fuel consumption efficiency, and so there is a need to secure rigidity and strength without increasing weight.

In consideration of the above circumstances, a subject of the present invention is to obtain a vehicle seat capable of achieving a reduction in weight whilst still securing rigidity and strength to counter load input during a vehicle collision.

A vehicle seat according to a first aspect of the present invention includes: a vehicle body side member that is attached to a vehicle body floor section; a seat cushion including a seat cushion frame that is disposed above the vehicle body side member, and having left and right side frames that face each other along a seat left-right direction; left and right front links that are provided respectively between front end sides of the left and right side frames and the vehicle body side member, each of the left and right front links configures a portion of a lifter mechanism that moves the seat cushion up and down with respect to the vehicle body side member, and one end side of each of the left and right front links is coupled to the vehicle body side member so as to be rotatable about an axis running along the seat left-right direction; and a coupling member that couples together front end sides of the left and right side frames along the seat left-right direction, that is rotatable with respect to the left and right side frames about an axis running along the seat left-right direction, and that is joined to other end side of each of the left and right front links.

In the vehicle seat of the first aspect, the left and right front links that configure a portion of the lifter mechanism are provided between the vehicle body side member that is attached to the vehicle body floor section and the front end sides of the left and right side frames that are provided to the seat cushion frame. The one end sides of each of the front links are respectively coupled to the vehicle body side member so as to rotatable about an axis running along the seat left-right direction, and the other end sides of each of the front links are respectively joined to the coupling member. The coupling member couples together the front end sides of the left and right side frames along the seat left-right direction so as to be rotatable with respect to the left and right side frames about an axis running along the seat left-right direction. When the seat cushion is being moved up or down by the lifter mechanism, the left and right front links are accordingly rotated integrally with the coupling member with respect to the seat cushion frame and the vehicle body side member about an axis running along the seat left-right direction.

In other words, the left and right front links are rotated with respect to the seat cushion frame about the coupling member that serves as a rotation shaft. The seat cushion frame can be reinforced by the coupling member since the coupling member couples together the front end sides of the left and right side frames along the seat left-right direction. Moreover, the coupling member can also reinforce the left and right front links since the respective other end sides of the left and right front links are joined to the coupling member.

In the vehicle seat of the first aspect, the left and right front links can accordingly be reinforced by the coupling member that serves as the rotation shaft of the left and right front links and also serves to reinforce the seat cushion frame. A reduction in weight of the vehicle seat can accordingly be achieved whilst still securing a rigidity and strength to counter load input during a vehicle collision.

A vehicle seat according to a second aspect of the present invention is the first aspect, wherein in the coupling member, a structure at a left end side that is joined to the front link on the left hand side is different to a structure at a right end side that is joined to the front link on the right hand side.

There are cases in which excessive load is input to the left hand side or the right hand side of the coupling member as well as the left and right front links due to an excessive load being input to the seat cushion through for example a seatbelt from an occupant who attempts to move under inertia caused by an impact during a vehicle collision. In the vehicle seat of the second aspect, the structure (such as the cross-sectional profile) can be set individually for the left end side and the right end side of the coupling member so as to accord with the differences in the characteristics of the load applied to the left end side and the right end side of the coupling member. A reduction in weight of the vehicle seat can accordingly be achieved efficiently due to being able to reinforce the left and right front links efficiently.

A vehicle seat according to a third aspect of the present invention is the second aspect, wherein the coupling member includes: a coupling pipe that couples front end sides of the left and right side frames together along the seat left-right direction, that is rotatable with respect to the left and right side frames about an axis running along the seat left-right direction, and that is joined to other end sides of the left and right front links; a left side bracing member that spans in a bracing shape between the front link on the left hand side and the coupling pipe and that is joined to both the front link on the left hand side and the coupling pipe; and a right side bracing member that spans in a bracing shape between the front link on the right hand side and the coupling pipe and is joined to both the front link on the right hand side and the coupling pipe, wherein a shape of the left side bracing member is different to a shape of the right side bracing member.

In the vehicle seat of the third aspect, the coupling member is formed by joining together three members of the coupling pipe, the left side bracing member and the right side bracing member. It is accordingly easier to set characteristics, such as the cross-section profile, individually for each portion of the coupling member according to differences in the load characteristics borne by the each portion than in a case in which the three members mentioned above are initially integrally manufactured. This is favorable from the perspective of efficiently achieving a reduction in weight for the vehicle seat.

A vehicle seat according to a fourth aspect of the present invention is the third aspect, wherein the seat cushion is disposed such that the seat left-right direction is oriented along the vehicle width direction and an occupant sits facing towards the vehicle front; the vehicle seat further includes a buckle device that is disposed inside in a vehicle width direction of the seat cushion, that is attached to the vehicle body side member or to the seat cushion frame, and to which a tongue plate attached to a seatbelt of a three-point seatbelt device couples; and one bracing member that, out of the left side bracing member and the right side bracing member, is disposed at the vehicle width direction outside forms a closed cross-section together with the front link and the coupling pipe.

In the vehicle seat of the fourth aspect, the occupant is restrained by the seatbelt when the occupant seated on the seat cushion and couples the tongue plate of the three-point seatbelt device to the buckle device. In this state, when the vehicle is involved in a front-on collision, load from the occupant attempting to move towards a vehicle front side under inertia is input into the seatbelt. When this occurs, a tensional force towards the vehicle front and a tensional force towards a vehicle width direction outside (a vehicle body side where two end portions of the seatbelt are anchored) arise due to input from the buckle device and act at the same time on the seat cushion. As a result, the left and right front links attempt to tilt over towards the vehicle width direction outside. In such a case, the one bracing member out of the left side bracing member and the right side bracing member that is disposed at the vehicle width direction outside bears a compression load between the vehicle width direction outside front link and the coupling pipe, and the other bracing member that is disposed on the vehicle width direction inside bears a tensional load between the vehicle width direction inside front link and the coupling pipe.

The one bracing member that is disposed on the vehicle width direction outside forms a closed cross-section together with the vehicle width direction outside front link and the coupling pipe. The one bracing member can accordingly be configured so as not to buckle under the compression load whilst still securing the minimum necessary rigidity and strength between the front link and the coupling pipe on the one side to counter compression load. An even more efficient reduction in weight can accordingly be achieved for the vehicle seat as a result.

A vehicle seat according to a fifth aspect of the present invention is the fourth aspect, wherein the other bracing member that, out of the left side bracing member and the right side bracing member, is disposed at the vehicle width direction inside is formed in an open cross-section profile.

In the vehicle seat of the fifth aspect, the vehicle width direction inside bracing member that bears the tensional load described above is formed in an open cross-section profile. As a result, securing the minimum necessary rigidity and strength of the bracing member with respect to tensional load enables a reduction in weight for the vehicle seat to be achieved.

Advantageous Effects

As explained above, a vehicle seat according to the present invention is capable of achieving a reduction in weight whilst still securing rigidity and strength to counter load input during a vehicle collision.

BRIEF DESCRIPTION OF THE DRAWINGS

Exemplary embodiments of the present invention will be described in detail based on the following figures, wherein.

DETAILED DESCRIPTION OF THE INVENTION

Explanation follows regarding a vehicle seat 10 according to an exemplary embodiment of the present invention with reference to FIG. 1 to FIG. 6. Note that in each of the drawings, an arrow FR indicates a front direction (progression direction), an arrow UP indicates an upwards direction, an arrow LH indicates a left hand direction, an arrow RH indicates a right hand direction and an arrow OUT indicates a vehicle width direction outside, as appropriate. Unless stated otherwise, references in the following explanation simply to front-rear, left-right, and up-down directions refer respectively to front and rear in the vehicle front-rear direction, left and right in the vehicle left-right direction (vehicle width direction), and up and down in the vehicle up-down direction. Moreover, in the following explanation, the vehicle width direction outside is referred to as an outer side, and the vehicle width direction inside is referred to as an inner side.

Configuration

Figure 1:
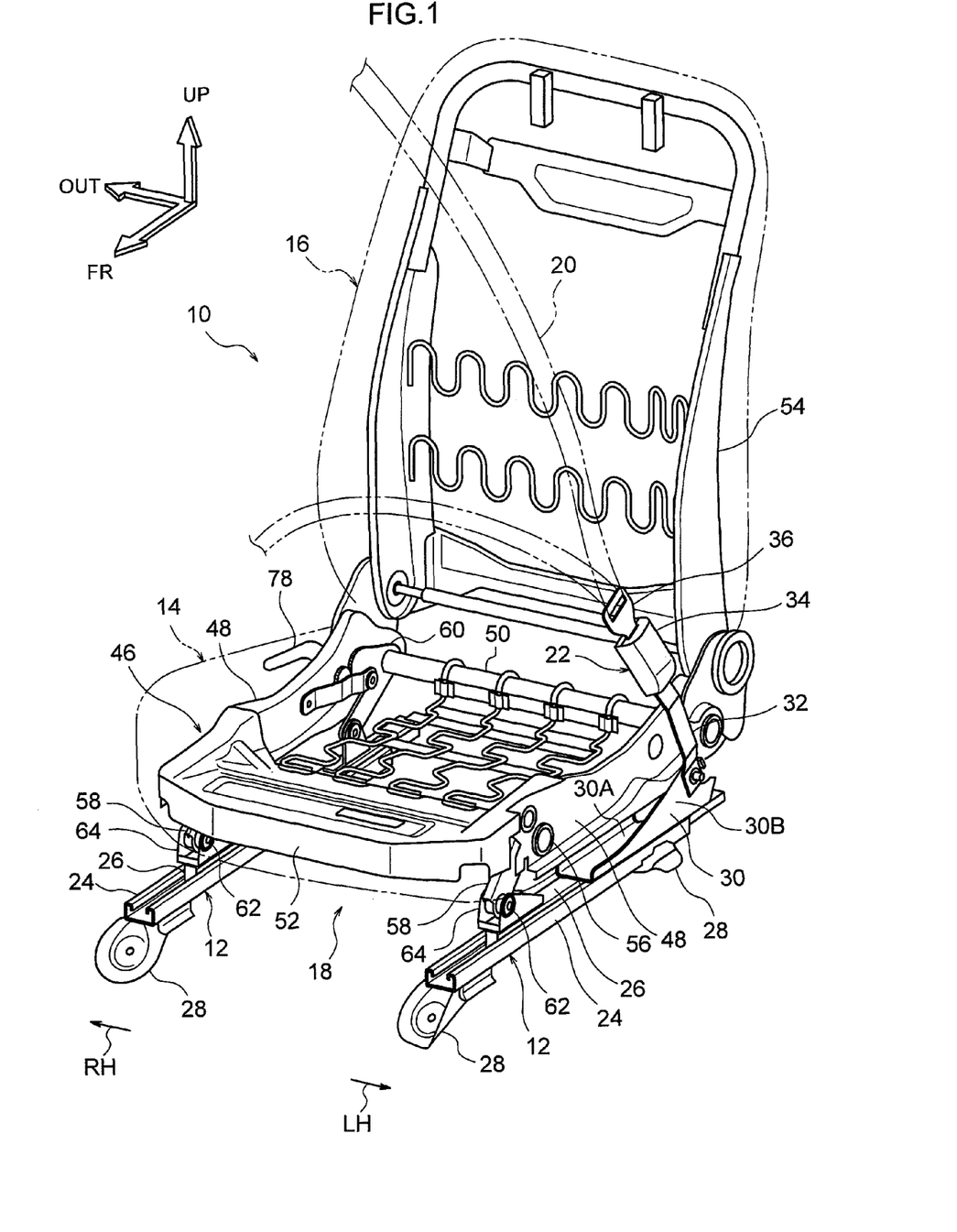
FIG. 1 is a perspective view illustrating a configuration of main portions of a vehicle seat according to an exemplary embodiment of the present invention.
Figure 4A:
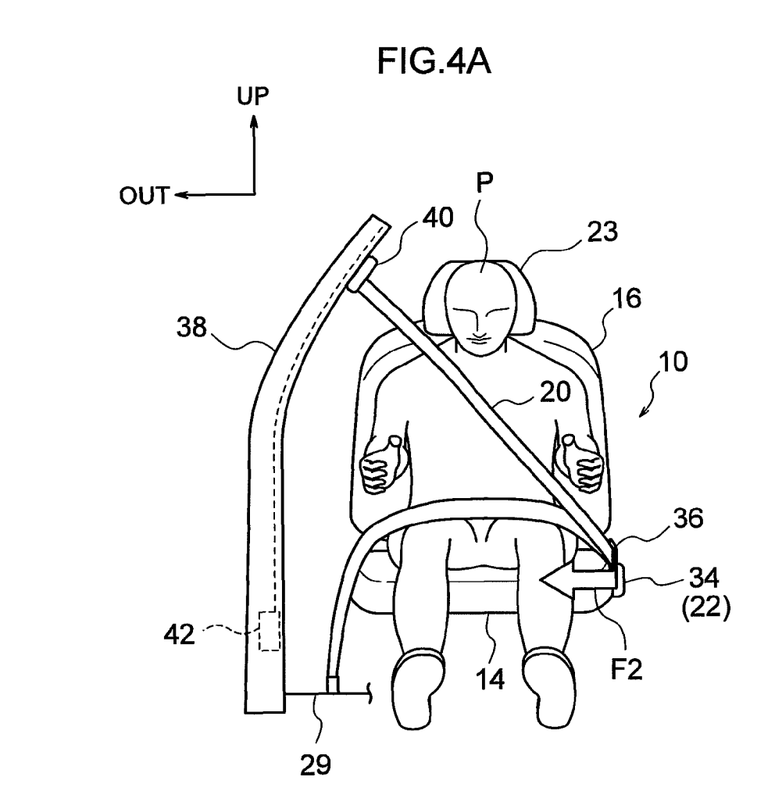
FIG. 4A is a front view and FIG. 4B is a side view for explaining load input to the vehicle seat during a vehicle front-on collision.
Figure 4B:
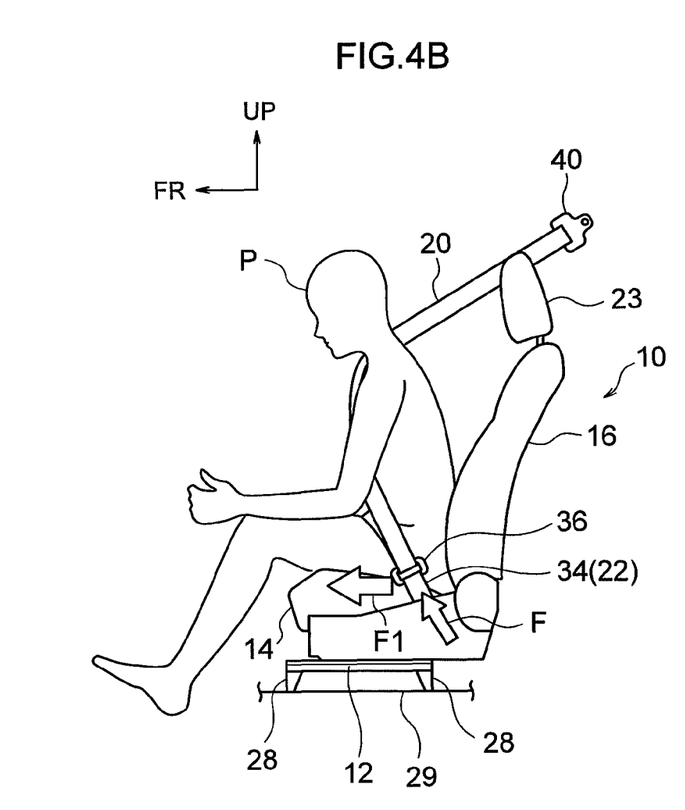
Figure 5:
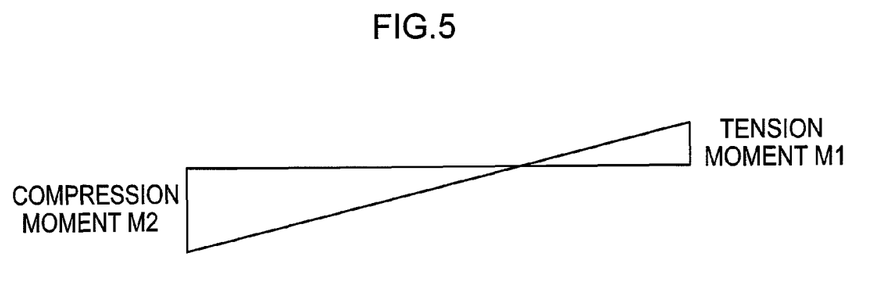
FIG. 5 is a bending moment diagram illustrating bending moments arising in the front link structural body.

As illustrated in FIG. 1, a vehicle seat 10 includes: a left and right pair of slide rails 12 serving as vehicle body side members; a seat cushion 14 configuring a seating section; a seat back 16 configuring a backrest with a lower end portion connected to a rear end portion of the seat cushion 14; a lifter mechanism 18 that moves the seat cushion 14 up and down with respect to the left and right slide rails 12; and a buckle device 22 employed with a seatbelt 20. A headrest 23 is attached to a top end portion of the seat back 16 (see FIG. 4).

Note that the vehicle seat 10 is provided so that an occupant is seated facing the vehicle front, such that the front-rear direction, the left-right direction (width direction) and the up-down direction of the vehicle seat 10 coincide respectively with the front-rear, left-right and up-down directions of the vehicle. In the present exemplary embodiment, the vehicle seat 10 is the drivers' seat in a right hand drive vehicle, however application may also be made to a front passenger seat or a rear seat.

Figure 2:
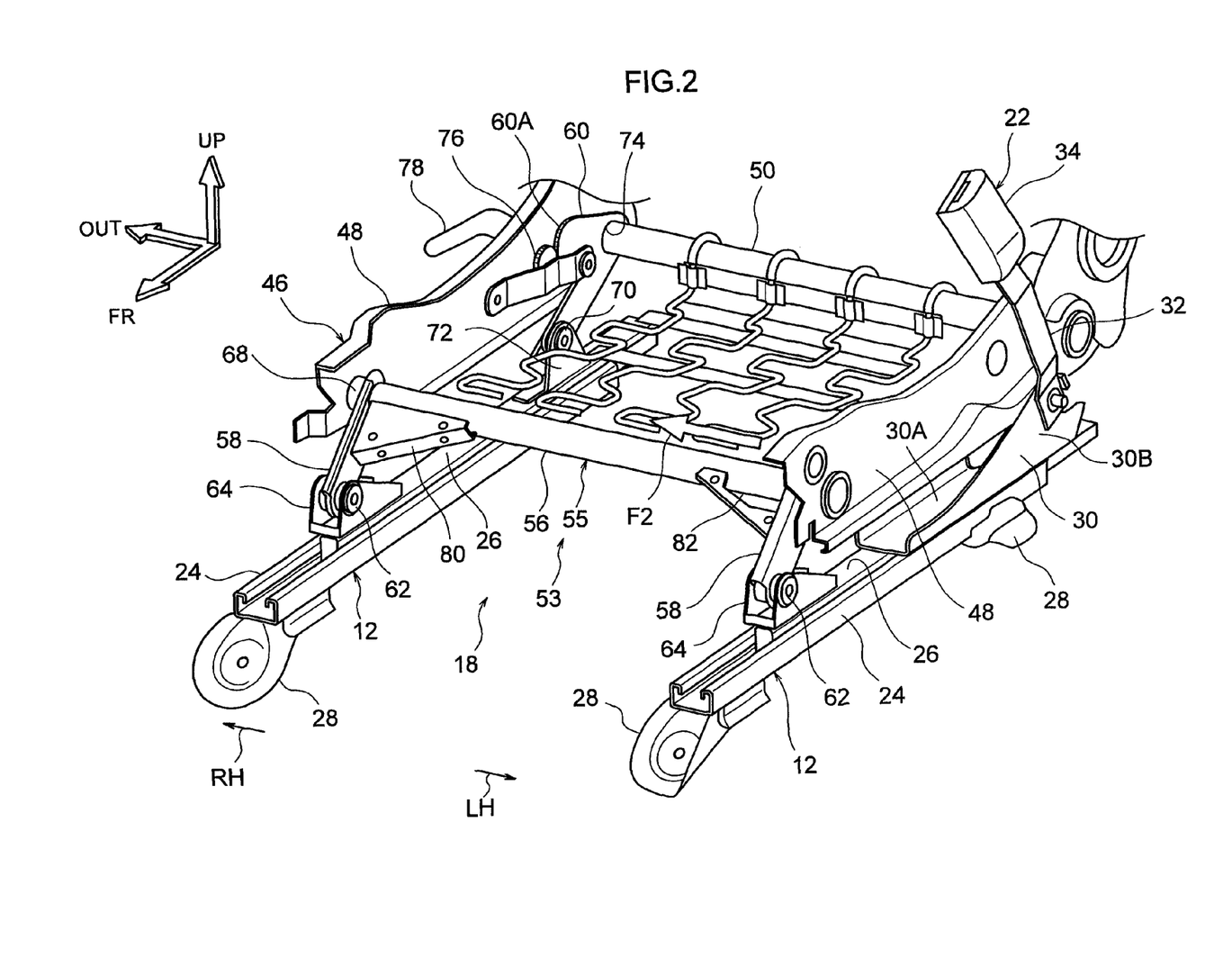
FIG. 2 is a perspective view illustrating a partial configuration of the vehicle seat.

As illustrated in FIG. 1 and FIG. 2, the left and right pair of slide rails 12 each include a lower rail 24 and an upper rail 26. The lower rails 24 are disposed such that their length directions are orientated along the front-rear direction, and a front end portion and a rear end portion of each of the lower rails 24 are fixed to a vehicle body floor section 29 through attachment brackets 28 (see FIG. 4B). The upper rails 26 are disposed such that their length directions are orientated along the front-rear direction, and are supported so as to be able to slide in the length direction with respect to the lower rails 24. Note that configuration is made such that although normally sliding of the upper rails 26 with respect to the lower rails 24 is restricted by a slide locking mechanism, not shown in the drawings, restriction of sliding from the slide locking mechanism is released by operating a lock release lever, not shown in the drawings.

A fixing section 30A of an anchor bracket 30 is fastened and fixed to an upper face of a rear portion of the upper rail 26 disposed on the left hand side (the inner side in this case). An upright wall portion 30B extends out upwards from an edge portion on the inner side of the fixing section 30A. A lower end portion of a stay 32 equipped with the buckle device 22 is fastened to an upper end portion of the upright wall portion 30B using a nut and bolt. A buckle 34 is fixed to an upper end portion of the stay 32. Configuration is such that a tongue plate 36 attached to the seatbelt 20 of a three-point seatbelt device couples to the buckle 34.

As illustrated in FIG. 4A, one length direction end portion of the seatbelt (webbing) 20 is anchored to a vehicle body floor section 29 on the outer side of the vehicle seat 10, and a length direction other end side is wound around a slip joint 40 attached to an upper end side of a B-pillar 38 of the vehicle body. A length direction other end portion of the seatbelt 20 is anchored to a take-up shaft of a seatbelt retractor 42 fixed to a lower end side of the B-pillar 38. An occupant P seated on the seat cushion 14 then couples the tongue plate 36 to the buckle 34, so as to restrain the occupant P using the seatbelt 20.

As illustrated in FIG. 1, the seat cushion 14 includes a seat cushion frame 46 disposed above the left and right slide rails 12. The seat cushion frame 46 is configured including left and right side frames 48, a rear frame 50 and a front frame 52 (not shown in FIG. 2). The left and right side frames 48 are formed in an elongated shape from, for example, sheet metal, and are disposed oriented with their length direction in the front-rear direction and with their thickness direction oriented in the left-right direction, so as to be separated from each other and face each other along the left-right direction.

The rear frame 50 is for example formed from metal piping and is disposed in a state with its axial direction (length direction) along the left-right direction so as to span across between rear end portions of the left and right side frames 48. Two length direction end portions of the rear frame 50 are inserted through circular shaped through holes formed in rear end portions of the left and right side frames 48, and are prevented from coming out by means of crimping, for example. The rear end portions of the left and right side frames 48 are accordingly connected together in the left-right direction by the rear frame 50, with the rear frame 50 capable of rotating with respect to the left and right side frames 48 about an axis running along the left-right direction. Note that a lower end portion of a seat back frame 54 that serves as a framework member of the seat back 16 is coupled to the rear end portions of the left and right side frames 48 through a known reclining mechanism. Moreover, a cushion pad covered with a seat cover is attached to the seat cushion frame 46 and the seat back frame 54.

The front frame 52 is formed in an elongated shape from, for example, sheet metal and is disposed in a state with its length direction along the left-right direction and its thickness direction along the up-down direction so as to span across between front end portions of the left and right side frames 48. The two length direction end portions of the front frame 52 are joined to the left and right side frames 48, and the front end portions of the left and right side frames 48 are connected together in the left-right direction by the front frame 52.

A coupling pipe (link pipe) 56 is provided below the front frame 52. The coupling pipe 56 configures a portion of the seat cushion frame 46 and also configures a portion of the lifter mechanism 18, described later. The coupling pipe 56 is formed, for example, from metal piping, and is disposed in a state with its axial direction (length direction) running along the left-right direction so as to span across between the front end portions of the side frames 48. The two length direction end portions of the coupling pipe 56 are inserted through circular shape through holes formed at the front end portions of the left and right side frames 48, and are prevented from coming out by means of crimping, for example. The front end portions of the left and right side frames 48 are accordingly connected together in the left-right direction by the coupling pipe 56, and the coupling pipe 56 is able to rotate with respect to the side frames 48 about an axis running along the left-right direction. Note that the coupling pipe 56 is disposed on movement trajectory of the buttocks of an occupant when what is referred to as a submarining phenomenon occurs, and has a function of preventing a submarining phenomenon from occurring.

Moreover, the lifter mechanism 18 is, as illustrated in FIG. 2, provided with a pair of left and right front links 58 provided between the front end portions of the left and right side frames 48 and the front end portions of the left and right upper rails 26, and with a pair of left and right rear links 60 provided between the rear end portions of the left and right side frames 48 and the rear end portions of the left and right upper rails 26. Note that FIG. 1 and FIG. 2 only illustrate the rear link 60 on the right hand side.

Figure 3:
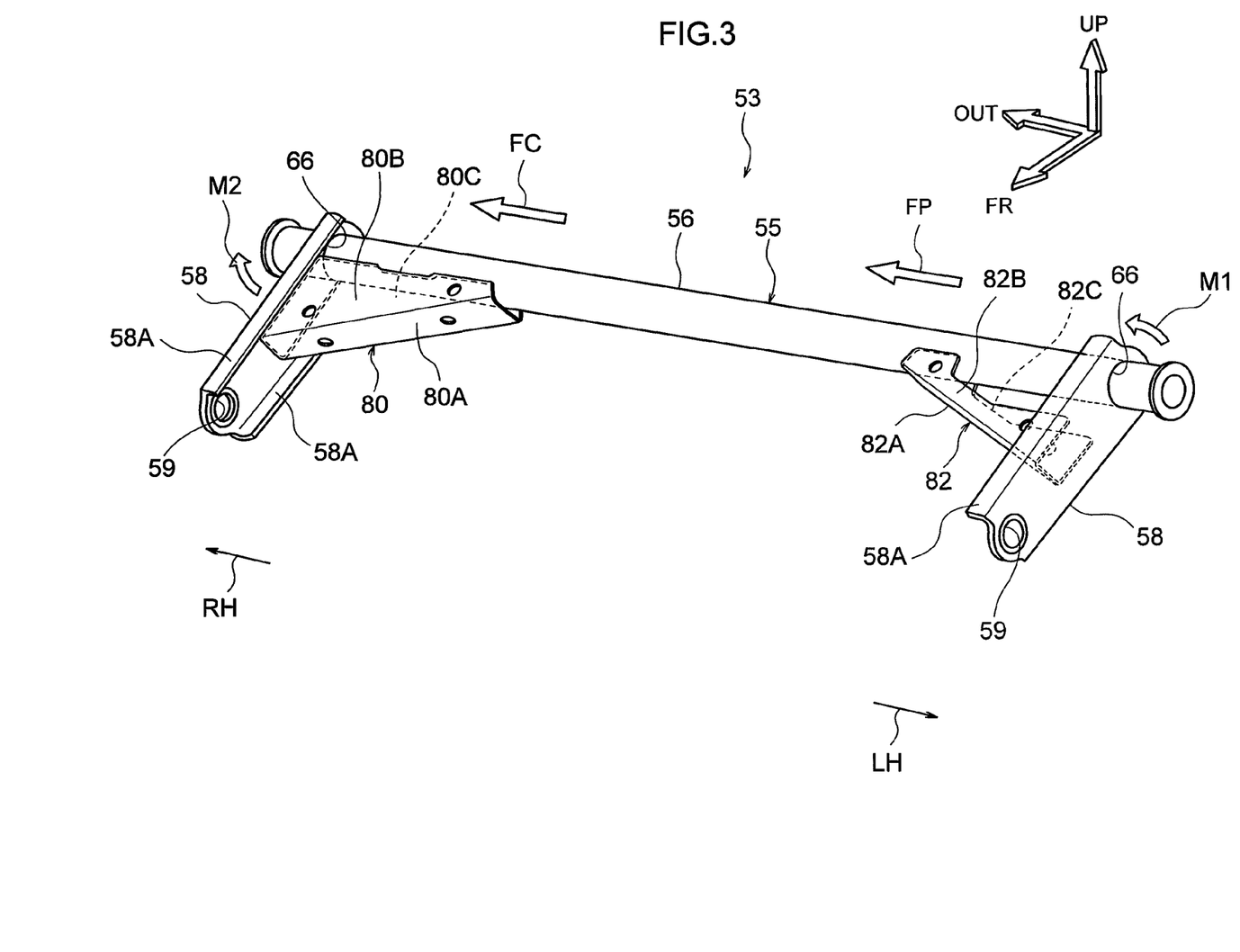
FIG. 3 is a perspective view illustrating a front link structural body (left and right front links and a coupling member) that is a configuration member of the vehicle seat.

As illustrated in FIG. 3, the left and right front links 58 are formed in an elongated shape from, for example, sheet metal and are disposed in a state such that their thickness directions run along the left-right direction. The two width direction end portions of the front links 58 are bent around towards the seat width direction inside to form a pair of reinforcement flange portions 58A. The bending rigidity of each of the front links 58 is accordingly raised. A circular shaped through hole 59 is formed in one length direction end portion (front end portion and lower end portion) of the left and right front links 58, respectively. The one length direction end portions of the left and right front links 58 are coupled through coupling shafts 62 that are inserted through the through holes 59 to brackets 64 that are fixed to the front end portions of the left and right upper rails 26. The coupling shafts 62 are oriented with their axial direction along the left-right direction, and the left and right front links 58 are capable of rotating with respect to the left and right upper rails 26 about an axis running along the left-right direction.

As illustrated in FIG. 2, the length direction other end portions of the left and right front links 58 (the rear/upper end portions) extend to a vicinity of the seat width direction inside of the front end portions of the left and right side frames 48. Circular through holes 66 (see FIG. 3) are formed respectively in the length direction other end portions of the left and right front links 58. The length direction end portions of the above coupling pipe 56 are respectively inserted through each of the through holes 66, and the length direction other end portions of the left and right front links 58 and the coupling pipe 56 are connected together by a method such as welding. The left and right front links 58 are thereby coupled to the front end portions of the left and right side frames 48 through the coupling pipe 56, and are capable of rotating integrally with the coupling pipe 56 with respect to the left and right side frames 48 about axes running along the left-right direction. Note that resin collars 68 (see FIG. 2) are interposed between the left and right front links 58 and the left and right side frames 48.

The left and right rear links 60 are formed in elongated shapes from, for example, sheet metal, and are disposed in a state with their thickness direction oriented along the left-right direction. One length direction end portion (front end portion and lower end portion) of each of the rear links 60 is, as illustrated in FIG. 2, coupled to brackets 72 that are fixed to the rear end side of the upper rails 26 through coupling shafts 70 with axial directions running along the left-right direction. The left and right rear links 60 are accordingly capable of rotating with respect to the left and right upper rails 26 about axes running along the left-right direction.

The length direction other end portions (rear end portion and upper end portion) of the left and right rear links 60 extend to vicinity of the seat width direction inside of the rear end portions of the left and right side frames 48. Circular shaped through holes 74 (see FIG. 2) are respectively formed in the length direction other end portions of the left and right rear links 60. Length direction end portions of the rear frame 50 are respectively inserted through each of the through holes 74, and the length direction other end portions of the left and right rear links 60 and the rear frame 50 are joined together by a method such as welding. The rear links 60 are accordingly coupled to rear end portions of the left and right side frames 48 through the rear frame 50 so as to be capable of rotating integrally with the rear frame 50 with respect to the left and right side frames 48 about an axis running along the left-right direction.

The four-jointed link mechanism is accordingly configured by the front links 58, the rear links 60, the side frames 48 and the upper rails 26, and the seat cushion frame 46 is coupled to the left and right slide rails 12 so as to be capable of moving up and down.

Moreover, as illustrated in FIG. 2, a sector gear portion 60A is provided at a length direction other end side of the right hand side rear link 60, and a pinion 76 meshes with the sector gear portion 60A. The pinion 76 is attached to an output shaft of a pump-action lifter apparatus, not shown in the drawings, that is attached to a side face on the outer side of the side frame 48 on the right hand side. A lifter lever 78 is attached to an input shaft of the pump-action lifter apparatus, such that the pinion 76 rotates by operating the lifter lever 78 up and down. When the pinion 76 rotates, the right hand side rear link 60 whose sector gear portion 60A is meshed with the pinion 76 rotates integrally with the rear frame 50 and with the left hand side rear link 60, not shown in the drawings, and the left and right front links 58 also rotate integrally with the coupling pipe 56 such that the seat cushion frame 46 is moved up or down with respect to the left and right slide rails 12.

In the present exemplary embodiment, a closed cross-section bracket 80 serving as a right hand side brace member (outside brace member) spans across and braces between the front link 58 on the outer side (in this case the right hand side) and the coupling pipe 56. Moreover, an open cross-section bracket 82 serving as a left hand side brace member (inside brace member) spans across and braces between the front link 58 on the inner side (in this case the left hand side) and the coupling pipe 56. The closed cross-section bracket 80 is joined to the outer side front link 58 and the coupling pipe 56 by a method such as welding, and the open cross-section bracket 82 is joined to the front link 58 on the inner side and the coupling pipe 56 by a method such as welding. A front link structural body 53 is accordingly integrally formed so as to configure a truss structure.

The closed cross-section bracket 80 and the open cross-section bracket 82 configure a coupling member 55 together with the coupling pipe 56, and the left and right front links 58 are configured so as to be connected together in the seat width direction by the coupling member 55. In the coupling member 55, the left end side and the right end side are different in shape due to the different shapes of the open cross-section bracket 82 and the closed cross-section bracket 80.

Namely, as illustrated in FIG. 3, the closed cross-section bracket 80 is for example formed by bend-forming sheet metal into a substantially U-shaped cross-section, and is configured by a bottom wall portion 80A that spans diagonally between a length direction intermediate portion of the outer side front link 58 and a length direction intermediate portion of the coupling pipe 56, and by a front wall portion 80B and a rear wall portion 80C that extend out towards the coupling pipe 56 side from the two width direction edge portions of the bottom wall portion 80A. The front wall portion 80B and the rear wall portion 80C are formed in substantially right-angled triangle shapes, with edge portions on the coupling pipe 56 side joined to the outer peripheral face of the coupling pipe 56, and edge portions on the outer side joined to the vehicle width direction inside face of the outer side front link 58. The closed cross-section bracket 80 thereby forms a closed cross-section together with the outer side front link 58 and the coupling pipe 56.

Similarly, the open cross-section bracket 82 is for example formed by bend-forming sheet metal into a substantially U-shaped cross-section that is configured by a bottom wall portion 82A provided diagonally between a length direction intermediate portion of the inner side front link 58 and a length direction intermediate portion of the coupling pipe 56, and by a front wall portion 82B and a rear wall portion 82C that extend out towards the coupling pipe 56 side from the two width direction edge portions of the bottom wall portion 82A. However, the front wall portion 82B and the rear wall portion 82C are formed in elongated substantially rectangular shapes, with only end portions on the outer side of the edge portions on the coupling pipe 56 side joined to the coupling pipe 56. The front wall portion 82B and the rear wall portion 82C are formed so as to separate from the coupling pipe 56 on progression towards the inner side, with the inner side end portions of the front wall portion 82B and the rear wall portion 82C joined to the vehicle width direction outside face of a length direction central portion of the inner side front link 58. The open cross-section bracket 82 accordingly does not form a closed cross-section together with the inner side front link 58 and the coupling pipe 56, and is open towards the coupling pipe 56 side.

Operation and Advantageous Effects

Explanation follows regarding operation and advantageous effects of the present exemplary embodiment.

In the vehicle seat 10 configured as described above, when the lifter lever 78 is operated up or down, the rotation of the pinion 76 is transmitted through the sector gear portion 60A to the outer side rear link 60. The outer side rear link 60 is accordingly rotated integrally with the rear frame 50 and the inner side rear link 60, not shown in the drawings, the left and right front links 58 rotate integrally with the coupling member 55, and the seat cushion frame 46 moves up or down with respect to the left and right slide rails 12.

In such a case, the left and right front links 58 are rotated with respect to the seat cushion frame 46 with a rotation axis of the coupling pipe 56 of the coupling member 55. The seat cushion frame 46 can accordingly be reinforced by the coupling pipe 56 due to the front end portions of the left and right side frames 48 being coupled in the left-right direction by the coupling pipe 56. Moreover, the left and right front links 58 can also be reinforced by the coupling pipe 56 due to the coupling pipe 56 being joined to each of the length direction other end portions of the left and right front links 58.

Consequently, in the present exemplary embodiment, the front links 58 can be reinforced by the coupling pipe 56 that serves both as the rotation axis of the left and right front links 58 and also to reinforce the seat cushion frame 46. A reduction in weight of the vehicle seat 10 can accordingly be achieved whilst still securing the rigidity and strength to counter load input during a vehicle collision.

Moreover, in the present exemplary embodiment, the coupling member 55 has different structures for the left end side that is joined to the inner side front link 58 and the right end side that is joined to the outer side front link 58. Thus even when an excessive load is input to the outer side (in this case the left hand side) or the inner side (in this case the right hand side) of the coupling member 55 and the left and right front links 58 due to excessive load from the occupant P who attempts to move under inertia from impact during a vehicle collision being input to the seat cushion 14 through the seatbelt 20 etc., the structure (such as the cross-sectional profile) can be set individually for the left end side and the right end side of the coupling member 55 so as to accord with the differences in the characteristics of the load applied to the left end side and the right end side of the coupling member 55. Consequently, a reduction in weight of the vehicle seat 10 can be achieved efficiently due to being able to reinforce the left and right front links 58 efficiently.

Namely, in the present exemplary embodiment, when the vehicle is involved in a front-on collision with the occupant P in a state restrained in the vehicle by the seatbelt 20, the load from the occupant P attempting to move towards the vehicle front side under inertia is input to the seatbelt 20. When this occurs, as illustrated in FIG. 4A and FIG. 4B, a tensional force F1 towards the vehicle front acts on the seat cushion 14 and, at the same time, a pulling force F2 towards a side of the rigid body B-pillar 38 (load towards the outer side) acts on the seat cushion 14 due to an input force F from the buckle device 22. As a result the left and right front links 58 attempt to tilt over towards the outer side. In such a case, the closed cross-section bracket 80 bears a compression load FC between the right hand side front link 58 and the coupling pipe 56, and the open cross-section bracket 82 bears a tensional load FP between the left hand side front link 58 and the coupling pipe 56 (see the bending moment diagram illustrated in FIG. 5). Due to individually setting the shapes of the closed cross-section bracket 80 and the open cross-section bracket 82 according to the different characteristics of these loads, the rigidity and strength of the closed cross-section bracket 80, the open cross-section bracket 82, the front link 58 and the coupling pipe 56 can be efficiently secured.

Specifically, the closed cross-section bracket 80 on the outer side that bears the compression load FC forms a closed cross-section together with the outer side front link 58 and the coupling pipe 56. Consequently, the closed cross-section bracket 80 can be configured so as not to buckle under compression load while still securing the minimum necessary rigidity and strength of the closed cross-section bracket 80, the front link 58 and the coupling pipe 56 on the outer side to the compression load FC. An efficient reduction in weight can accordingly be achieved on the outer side of the vehicle seat 10, enabling a reduction in weight of the overall configuration of the vehicle seat 10 overall to be achieved as a result.

n the present exemplary embodiment, the open cross-section bracket 82 on the inner side that only bears the tensional load FP is formed with an open cross-section shape in a configuration that secures the minimum cross-section (rigidity and strength) to the tensional load FP. A reduction in weight can accordingly be made to the inner side of the vehicle seat 10, enabling a reduction in weight of the overall configuration of the vehicle seat 10 to be achieved as a result.

Figure 6:
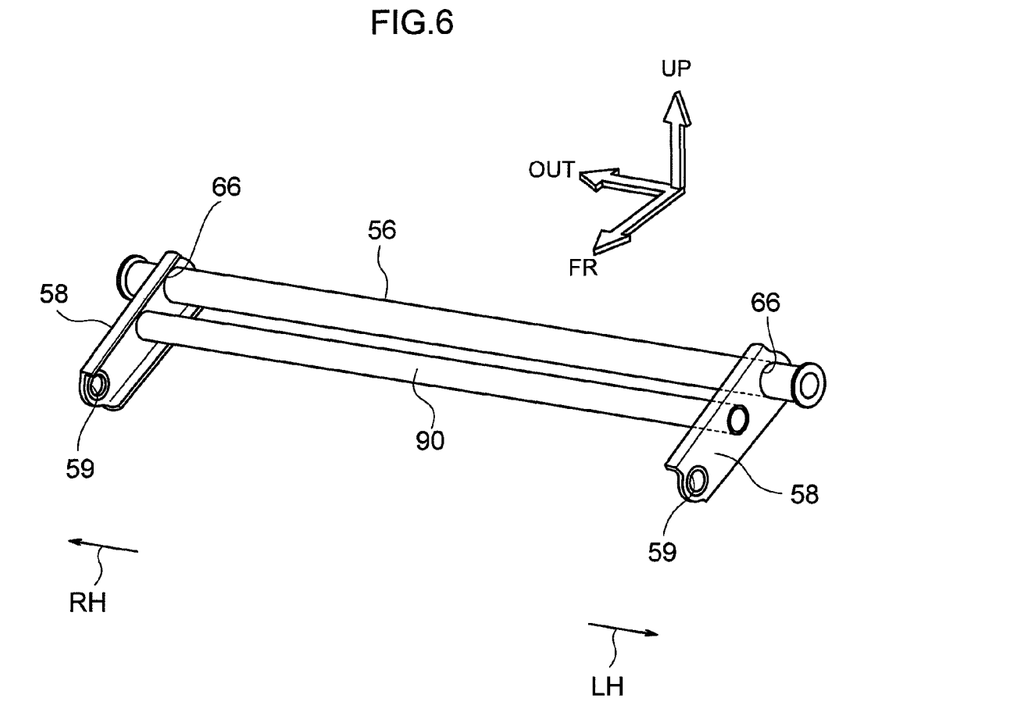
FIG. 6 is a perspective view illustrating a modified example of a front link structure according to an exemplary embodiment of the present invention.

Note that the left and right front links 58 can be prevented or suppressed from tipping sideways by coupling together length direction intermediate portions of the left and right front links 58 using pipe shaped reinforcement 90, as in a Comparative Example illustrated in FIG. 6. However, in this Comparative Example, there is an unnecessary increase in weight due to there being a uniform cross-section profile along the length direction of the reinforcement 90. In contrast thereto, in the present exemplary embodiment it is possible to achieve a reduction in weight of about 50% over the Comparative Example by the particular configuration as described above.

Moreover, in the present exemplary embodiment, the coupling member 55 is formed by joining together 3 members, namely the coupling pipe 56, the closed cross-section bracket 80 and the open cross-section bracket 82. It is accordingly easier to set characteristics, such as the cross-section profile, individually for each portion of the coupling member, according to differences in the load borne by each portion than in a case in which the three members are initially integrally manufactured. This is favorable from the perspective of efficiently achieving a reduction in weight.

Supplementary Explanation of Exemplary Embodiments

In the above exemplary embodiment, the open cross-section bracket 82 disposed at the inner side (the left side bracing member) is formed with an open cross-section, however the present invention is not limited thereto, and appropriate modifications may be made to the configuration of the bracing member disposed on the inner side. For example, the bracing member disposed on the inner side may be formed by wire. Moreover, configuration may also be made with the bracing member omitted on the inner side.

Moreover, in the above exemplary embodiment, the closed cross-section bracket 80 disposed on the outer side (the right hand side bracing member) is configured to form a closed cross-section together with the outer side front link 58 and the coupling pipe 56, however the present invention is not limited thereto, and appropriate modifications may be made to the configuration of the bracing member disposed on the outer side. For example, configuration may be made with the bracing member disposed on the outer side formed by a piping or a flat plate material.

Moreover, in the above exemplary embodiment configuration is made with the coupling member 55 formed from the coupling pipe 56, the closed cross-section bracket 80 (the right side bracing member) and the open cross-section bracket 82 (the left side bracing member). However the present invention is not limited thereto, and appropriate modifications may be made to the configuration of the coupling member. For example, configuration may be made with a right hand side reinforcement portion integrally provided on the right end side of the coupling member joined to a right hand side front link, and a left hand side reinforcement portion integrally provided on the left end side of the coupling member joined to a left hand side front link. Moreover, configuration may be made with a coupling member formed only from a coupling pipe.

Moreover, in the above exemplary embodiment, configuration is made with different structures for the left end side and the right end side of the coupling member, however the present invention is not limited thereto, and configuration may be made with the same structure on the left end side and the right end side of the coupling member.

Moreover, in the above exemplary embodiment, configuration is made with a seatbelt retractor 42 fixed to a lower end portion of the B-pillar 38, however the present invention is not limited thereto, and configuration may be made with a seatbelt retractor provided to a seatback of the vehicle seat (called an integral seat).

Furthermore, in the above exemplary embodiment, explanation has been given of a case in which the present invention is applied to a driver's seat of a right hand drive vehicle, however configuration is left-right reversed to that of the above exemplary embodiment for cases in which the present invention is applied to a front-passenger seat of a right hand drive vehicle or to the driver's seat of a left hand drive vehicle.

Various other modifications may also be implemented in the present invention within a range not departing from the spirit of the present invention. Obviously the scope of rights of the present invention is also not limited by the above exemplary embodiment.

What is claimed is:

1. A vehicle seat comprising:
   a vehicle body side member that is attached to a vehicle body floor section;
   a seat cushion comprising a seat cushion frame that is disposed above the vehicle body side member, and having left and right side frames that face each other along a seat left-right direction;
   left and right front links that are provided respectively between front end sides of the left and right side frames and the vehicle body side member, each of the left and right front links configures a portion of a lifter mechanism that moves the seat cushion up and down with respect to the vehicle body side member, and one end side of each of the left and right front links is coupled to the vehicle body side member so as to be capable of rotating about an axis running along the seat left-right direction; and
   a coupling member that couples together front end sides of the left and right side frames along the seat left-right direction, that is rotatable with respect to the left and right side frames about an axis running along the seat left-right direction, and that is joined to other end side of each of the left and right front links,
   wherein the coupling member comprises a coupling pipe and at least one bracing member oriented so as to form a non-right angle with respect to an axis of the coupling pipe, and wherein the coupling pipe is directly coupled to the left and right front links.

2. The vehicle seat according to claim 1, wherein in the coupling member, a structure at a left end side that is joined to the front link on a left hand side is different to a structure at a right end side that is joined to the front link on a right hand side.

3. The vehicle seat of claim 2, wherein the coupling pipe couples front end sides of the left and right side frames together along the seat left-right direction, is rotatable with respect to the left and right side frames about the axis running along the seat left-right direction, and is joined to other end sides of the left and right front links; and
   wherein the at least one bracing member comprises a left side bracing member and a right side bracing member, the left side bracing member spanning in a bracing shape between the front link on the left hand side and the coupling pipe and that is joined to both the front link on the left hand side and the coupling pipe, and wherein the right side bracing member spans in a bracing shape between the front link on the right hand side and the coupling pipe and that is joined to both the front link on the right hand side and the coupling pipe, and wherein a shape of the left side bracing member is different than a shape of the right side bracing member.

4. The vehicle seat of claim 3, wherein:
   the seat cushion is disposed such that the seat left-right direction is oriented along the vehicle width direction and an occupant sits facing towards a vehicle front;
   the vehicle seat further comprises a buckle device that is disposed at an inside in a vehicle width direction of the seat cushion, that is attached to the vehicle body side member or to the seat cushion frame, and to which a tongue plate attached to a seatbelt of a three-point seatbelt device couples; and
   one bracing member that, out of the left side bracing member and the right side bracing member, is disposed at the vehicle width direction outside forms a closed cross-section together with the front link and the coupling pipe.

5. The vehicle seat of claim 4, wherein the other bracing member that, out of the left side bracing member and the right side bracing member, is disposed at the vehicle width direction inside is formed in an open cross-section profile.

* * * * *